United States Patent
Picconi (10) Patent No.: US 9,560,422 B2
(45) Date of Patent: Jan. 31, 2017

(54) PEER-ASSISTED VIDEO DISTRIBUTION

(71) Applicant: THOMSON LICENSING, Issy de Moulineaux (FR)

(72) Inventor: Fabio Picconi, Paris (FR)

(73) Assignee: Thomson Licensing, Issly les Moulineaux (FR)

( * ) Notice: Subject to any disclaimer, the term of this patent is extended or adjusted under 35 U.S.C. 154(b) by 47 days.

(21) Appl. No.: 14/395,473

(22) PCT Filed: Apr. 4, 2013

(86) PCT No.: PCT/EP2013/057120
§ 371 (c)(1),
(2) Date: Oct. 17, 2014

(87) PCT Pub. No.: WO2013/160080
PCT Pub. Date: Oct. 31, 2013

(65) Prior Publication Data
US 2015/0058907 A1  Feb. 26, 2015

(30) Foreign Application Priority Data
Apr. 23, 2012 (EP) .................... 12305464

(51) Int. Cl.
*H04N 21/63* (2011.01)
*H04N 21/2389* (2011.01)
(Continued)

(52) U.S. Cl.
CPC .......... *H04N 21/632* (2013.01); *H04L 65/602* (2013.01); *H04L 65/604* (2013.01);
(Continued)

(58) Field of Classification Search
CPC ............ H04N 21/2343; H04N 21/2389; H04N 21/242; H04N 21/26258; H04N 21/4385; H04N 21/44004; H04N 21/44008; H04N 21/4402; H04N 21/632; H04N 21/8456; H04L 65/602; H04L 65/604; H04L 67/104
See application file for complete search history.

(56) References Cited

U.S. PATENT DOCUMENTS 7,373,079 B2  5/2008  Nakamura et al.
7,386,223 B2  6/2008  Yagi et al.
(Continued)

OTHER PUBLICATIONS

Telecom STD Sector of ITU, H.222.0 IT-Generic coding of MP and Assciated audio information systems, May 2006, Rev. (May 2006), Intro, p. 5-6, 19, 21, 23, 37, 39, 151.*
(Continued)

*Primary Examiner* — Rong Le
(74) *Attorney, Agent, or Firm* — Brian J. Dorini; Jerome G. Schaefer (57) ABSTRACT

A solution for peer-assisted distribution of video content over a broadband network is disclosed. A video file is segmented into segments and segmentation metadata is generated. The segments are converted to media stream segments with counter/timestamp consistency. The video file and the segmentation metadata are injected into a peer-assisted video delivery system. The segmentation metadata are then used for initializing download of offsets of the video file that are required for generating segments of the video file at a client.

18 Claims, 3 Drawing Sheets

(51) Int. Cl.
    *H04N 21/2343*    (2011.01)
    *H04N 21/845*     (2011.01)
    *H04L 29/08*      (2006.01)
    *H04L 29/06*      (2006.01)
    *H04N 21/262*     (2011.01)
    *H04N 21/242*     (2011.01)
    *H04N 21/4385*    (2011.01)
    *H04N 21/44*      (2011.01)
    *H04N 21/4402*    (2011.01)

(52) U.S. Cl.
    CPC ....... *H04L 67/104* (2013.01); *H04N 21/2343* (2013.01); *H04N 21/2389* (2013.01); *H04N 21/242* (2013.01); *H04N 21/26258* (2013.01); *H04N 21/4385* (2013.01); *H04N 21/4402* (2013.01); *H04N 21/44004* (2013.01); *H04N 21/44008* (2013.01); *H04N 21/8456* (2013.01)

(56) References Cited

U.S. PATENT DOCUMENTS

| | | |
|---|---|---|
| 2008/0033881 A1 | 2/2008 | Ficco |
| 2010/0169303 A1 | 7/2010 | Biderman et al. |
| 2010/0169459 A1* | 7/2010 | Biderman .......... H04N 7/17318 709/219 |
| 2011/0231519 A1 | 9/2011 | Luby et al. |
| 2012/0011267 A1 | 1/2012 | Ma et al. |
| 2012/0304233 A1* | 11/2012 | Roberts ............ H04N 21/23113 725/82 |

OTHER PUBLICATIONS

Pantos et al: "HTTP Live Streaming; draft-pantos-http-live-streaming-07.txt", HTTP Live Streaming; No. 7, Oct. 1, 2011 (Oct. 1, 2011), pp. 1-33.
Aalto et al.: "Segmented P2P video-on-demand: Modeling and performance:" Publication Date : Sep. 7, 2010; IEEE; pp. 1-8.
Wang et al.: "Is playing-as-downloading feasible in an eMule P2P file sharing system?"; Jun. 2010; vol. 11 (2010); pp. 465-475.
http://ffmpeg.org/ (Jun. 4, 2002) one page.
http://gpac.wp.institut-telecom.fr/mp4box/ (Mar. 7, 2012), Telecom.
ISO/IEC DIS 23009-1.2. "Dynamic Adaptive Streaming over HTTP" (May 12, 2014); pp. 1-2.
Furini: "On ameliorating the perceived playout quality in chunk-driven P2P media streaming systems"; Jun. 24, 2007 : IEEE; pp. 1679-1684.
Search Report Dated May 28, 2013.

* cited by examiner

PEER-ASSISTED VIDEO DISTRIBUTION

This application claims the benefit, under 35 U.S.C. §365 of International Application PCT/EP2013/057120, filed Apr. 4, 2013, which was published in accordance with PCT Article 21(2) on Oct. 31, 2013 in English and which claims the benefit of European patent application No. 12305464.5, filed Apr. 23, 2012.

The present invention relates to a solution for peer-assisted distribution of video content over a broadband network, and more specifically to a solution for peer-assisted distribution of video content, which enables a small buffering time until playback, as well as quick fast-forward or rewind operations.

Video accounts for a large fraction of the content consumed today on the Internet. A plurality of websites providing video services constantly deliver video clips or movies to a myriad of different devices, e.g. PCs, TVs, smartphones, and tablets. The consumption of video content is expected to increase as fiber-to-the-home and other high-speed broadband technologies become increasingly widespread.

To support the massive bandwidth requirements of video delivery, service providers employ Content Delivery Networks (CDNs), a set of geographically distributed servers from which users download content. To further improve the efficiency of content distribution, peer-assisted architectures have been proposed, in which users download content from both the CDN and the set-top-boxes or home gateways of other users. In this case, the set-top-boxes or gateways store several video clips on their local hard disk or flash memory and use the available upload bandwidth of the user's home connection to upload fragments of such clips to other users.

For example, the article Wang et al.: "Is playing-as-downloading feasible in an eMule P2P file sharing system?", J. Zhejiang Univ.-Sci. C (Comput. & Electron.), Vol. 11 (2010), pp. 465-475, discusses a solution for peer-to-peer (P2P) swarm technologies with media streaming support, which has a playing-as-downloading capability. A new algorithm is introduced, named wish driven chunk distribution (WDCD), which enables the P2P file sharing system to support the video-on-demand (VOD) function while keeping the P2P native downloading speed. A new parameter named next-play-frequency, is added to the content chunk to strike a replication balance between downloading and streaming requests.

The present invention focuses on peer-assisted video distribution systems, and in particular the problem of on-the-fly generation of video segments to support protocols such as HTTP Live Streaming (HLS). The HLS standard describes a protocol for video delivery which supports nice features such as downloading from multiple sources and adaptive stream rates (see: http://tools.ietf.org/html/draft-pantos-http-live-streaming-07). However, one constraint of HLS is that it requires the use of an MPEG Transport Stream (MPEG-TS) container. Therefore, if a video is originally stored in another format, such as MP4 or Matroska (MKV), it must be converted into MPEG-TS before it can be delivered through HLS. Moreover, the MPEG-TS stream must be divided into chunks, or media segments, such that MPEG-TS continuity counters and timestamps are consistent when the segments are stitched back together by the HLS player. The step is known as segmentation. In the following text the terms "segment" and "chunk" will be used indistinctively.

Several tools currently exist to perform conversion and segmentation in order to produce HLS-compliant segmentation. However, they all take as input the entire source file.

To see why this is a problem for peer-assisted systems, consider the following. To support a wide range of user devices (PCs, smartphones, etc.), the system can deliver a given video either as a single MP4 file through HTTP, or as multiple MPEG-TS segments through HLS. However, to save storage space, the system only stores each video as an MP4 file. Whenever a user requests the video through HLS, the local peer-to-peer client downloads the MP4 content, converts it into MPEG-TS, and segments the result into HLS chunks. However, since existing HLS segmenter tools work only on entire files, the peer-to-peer client must finish downloading the entire MP4 video before HLS chunks can be created and playback can begin. This is clearly unacceptable.

It is an object of the present invention to propose an improved solution for peer-assisted distribution of video content over a network.

According to the invention, a method for distributing a video file comprising frames via a peer-assisted video delivery system comprises the steps of:
- segmenting the video file into temporal segments such that any frame of the video file is present in one and only one temporal segment, wherein each temporal segment is a self-contained physical object;
- generating segmentation metadata comprising at least offsets of the temporal segments relative to the video file, continuity counter values, and segment start times;
- converting the temporal segments into media stream segments in accordance with a media stream format, which uses continuity counters and/or timestamps, such that the continuity counters within the media stream segments are properly incremented and/or the timestamps within the media stream segments are valid and synchronized; and
- injecting the video file and the segmentation metadata into the peer-assisted video delivery system.

Accordingly, an apparatus for distributing a video file comprising frames via a peer-assisted video delivery system comprises:
- a segmenter for segmenting the video file into temporal segments such that any frame of the video file is present in one and only one temporal segment, wherein each temporal segment is a self-contained physical object, and for generating segmentation metadata comprising at least offsets of the temporal segments relative to the video file, continuity counter values, and segment start times;
- a converter for converting the temporal segments into media stream segments in accordance with a media stream format, which uses continuity counters and/or timestamps, such that the continuity counters within the media stream segments are properly incremented and/or the timestamps within the media stream segments are valid and synchronized; and
- an injector for injecting the video file and the segmentation metadata into the peer-assisted video delivery system.

According to one aspect of the invention the video file, e.g. an MP4 file or an MKV file, is first segmented into segments. Preferably, these segments are fixed-duration segments. Segmentation metadata are generated during segmentation. The resulting segments are converted to media stream segments, e.g. to MPEG-TS segments, with counter/timestamp consistency. Optionally, a sanity check is performed on the media stream segments. Subsequently, the video file and the segmentation metadata are injected into the peer-assisted video delivery system.

A method for receiving a video file from a peer-assisted video delivery system comprises the steps of:
  downloading segmentation metadata comprising at least offsets of temporal segments of the video file relative to the video file, continuity counter values, and segment start times;
  analyzing the segmentation metadata to determine video offsets to be downloaded and for initiating download of the determined video offsets;
  generating video segments from the downloaded video offsets; and
  converting the video segments into media stream segments in accordance with a media stream format, which uses continuity counters and/or timestamps, such that the continuity counters within the media stream segments are properly incremented and/or the timestamps within the media stream segments are valid and synchronized.

Accordingly, an apparatus for receiving a video file from a peer assisted video delivery system comprises:
  a network connector for downloading segmentation metadata comprising at least offsets of temporal segments of the video file relative to the video file, continuity counter values, and segment start times;
  an analyzer for analyzing the segmentation metadata to determine video offsets to be downloaded and for initiating download of the determined video offsets;
  a segment generator for generating video segments from the downloaded video offsets; and
  a converter for converting the video segments into media stream segments in accordance with a media stream format, which uses continuity counters and/or timestamps, such that the continuity counters within the media stream segments are properly incremented and/or the timestamps within the media stream segments are valid and synchronized.

For regenerating the media stream segments, in a first step the segmentation metadata file is downloaded. The segmentation metadata are then analyzed to determine which video offsets, e.g. MP4 or MKV offsets, need to be downloaded. Subsequently download of the determined video offsets is initiated. Video segments are then generated from the downloaded video offsets, which are finally converted to media stream segments, e.g. to MPEG-TS segments, with counter/timestamp consistency.

The solution according to the invention allows a peer to produce media stream segments without downloading the entire source video file. This enables a small buffering time until playback, i.e. playback can begin before the entire file is downloaded, as well as quick fast-forward or rewind operations. In addition, as the file is stored in only one format, the solution is very efficient in terms of storage requirements. Furthermore, it is compatible with existing standards.

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures.

In the following description the case of on-the-fly MP4-to-HLS conversion will be considered. However, the invention also works for other input formats, e.g. MKV-to-HLS conversion. In addition, the mechanism behind the invention is not specific to HLS, and can be applied to similar target protocols such as Dynamic Adaptive Streaming over HTTP (DASH).

Figure 1:
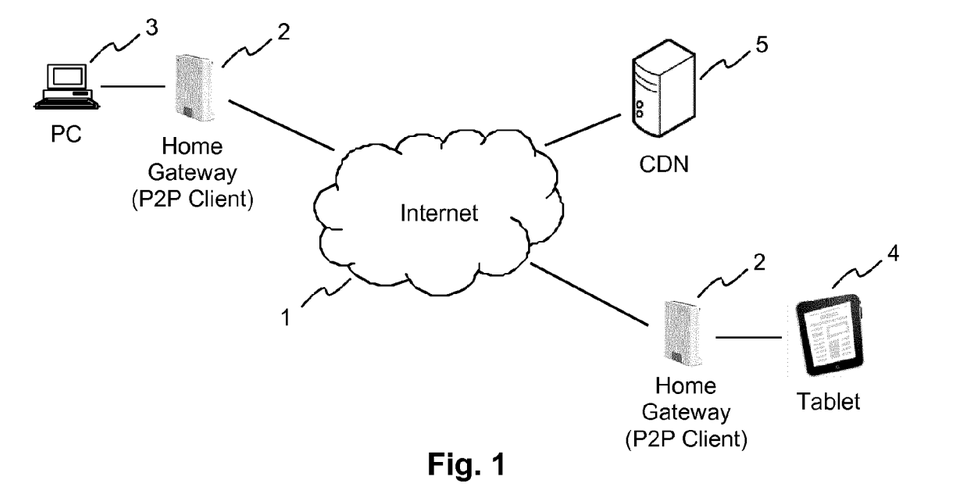
FIG. 1 illustrates a peer-assisted video delivery system.

FIG. 1 illustrates the different components of a peer-assisted system for video delivery via a network 1. It is assumed that a peer-to-peer client runs on each home gateway 2 connected to the network 1. Videos can be watched from different user devices, such as PCs 3 and tablets 4. When a user starts watching a video, the peer-to-peer client on the gateway 2 downloads pieces of video data from other peer-to-peer clients and/or the CDN 5, reassembles the stream, and forwards it to the user device. Of course, the peer-to-peer client may likewise run on the user device instead of the home gateway 2.

Figure 2:
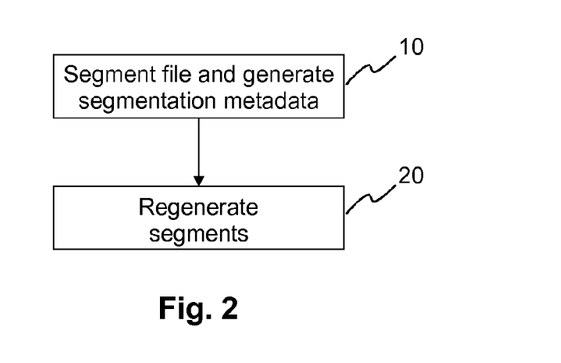
FIG. 2 schematically depicts a method according to the invention for peer-assisted video delivery.

FIG. 2 schematically depicts a method according to the invention for peer-assisted video delivery. The method is essentially composed of two steps. In a first step 10 an MP4 file is segmented and a segmentation metadata file is generated. In a second step 20 HLS segments are regenerated. The first step 10 is executed whenever a MP4 file is first injected into the system, i.e. into the CDN plus the peer-to-peer storage, and becomes available for download. This step analyzes the file and generates some metadata that will be used during the second step 20, which is executed whenever a peer-to-peer client needs to generate a HLS chunk on-the-fly.

Figure 3:
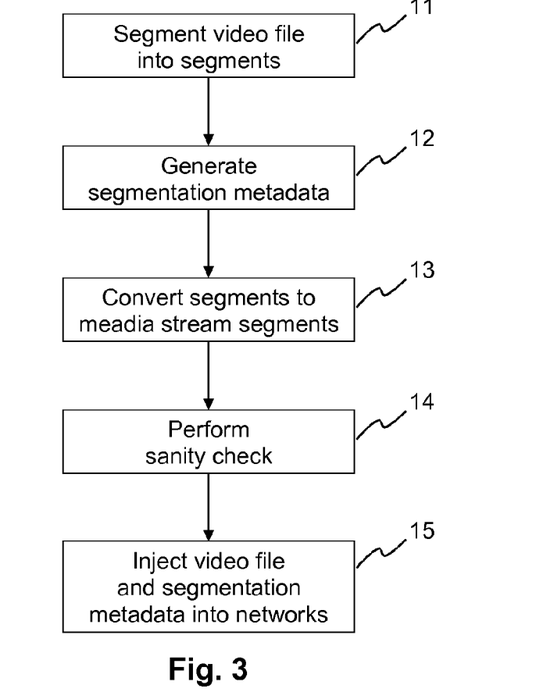
FIG. 3 describes segmentation of an MP4 file and generation of a segmentation metadata file.

FIG. 3 describes the segmentation of the MP4 file and the generation of the segmentation metadata file in more detail. This step is composed of several steps. First the MP4 file is segmented 11 into MP4 segments, preferably fixed-duration segments, and segmentation metadata is generated 12. These segments are converted 13 to MPEG-TS segments with counter/timestamp consistency. Then an MPEG-TS sanity check is performed 14 and the video file and the segmentation metadata are injected 15 into the CDN and the P2P network.

The segmentation step 11 is run on a computer which stores the entire MP4 source file. The computer invokes a segmenter tool to generate all target segments. For instance, if the file is to be segmented into k chunks, then the tool is invoked k times, once for each segment. At each invocation, the tool receives as parameter the segment start and end times. For example, if segments are 5 seconds long, and the third segment is to be generated, then the tool is invoked with "start time t=10" and "end time t=15".

A critical issue here is that the created segments must not contain overlapping video/audio frames, that is, a frame must not be present in more than one segment. Similarly, all frames must be present in at least one segment. These two conditions ensure that stitching the resulting segments will result in continuous and error-free playback.

Today, no existing tools support this type of segmentation out-of-the-box. For instance, the popular tool MP4Box can create individual chunks specified by "start time" and "end time" parameters. However, the resulting chunks will contain overlapping video/audio frames. Nevertheless, a workaround exists for this problem that allows MP4Box to be used without modifying its source code. The latest development version of MP4Box supports the -split-chunk S:E option. This option generates a chunk specified by a start time S and an end time E. However, the tool may adjust the start time to align it to a particular frame. For instance, invoking the tool with "-split-chunk 5:10" may result in a chunk that begins at t=4.96 and ends at t=10. If the previous chunk ends at t=5, then some frames may be present in both chunks, causing problems when the chunks are stitched back together.

A workaround for this problem consists in invoking MP4Box in two passes. During the first pass, it is invoked using the following options (for a duration of 5 seconds):

| | |
|---|---|
| segment 1 | -split-chunk 0:5 |
| segment 2 | -split-chunk 5:10 |
| segment 3 | -split-chunk 10:15 |
| segment 4 | -split-chunk 15:20 |
| . | |
| . | |
| . | |

On each invocation, MP4Box may output that it has adjusted the start time to a particular value, for instance t=14.96 instead of t=15. These modified start times are stored in a temporary file.

During the second pass, MP4Box is invoked again to generate all chunks, but replacing the end time of chunks according to the start time of the following chunk. In the above example, this would result in the following options:

| | |
|---|---|
| segment 1 | -split-chunk 0:5 |
| segment 2 | -split-chunk 5:10 |
| segment 3 | -split-chunk 10:14.96 |
| segment 4 | -split-chunk 15:20 |
| . | |
| . | |
| . | |

Note that the option for segment 4 specified a start time at t=15. This is intended, as MP4Box will adjust the start time of the chunk to 14.96, exactly as it did in the first pass.

During the second pass, the system monitors the MP4 source file offsets accessed by MP4Box and stores them in the segmentation metadata file. Finally, the adjusted start times are also added to the segmentation metadata file.

The following is an example of a segmentation metadata file that uses JSON encoding (JavaScript Object Notation).

```
[
    {
        "index": 1,
        "start": 0,
        "end": 5.00,
        "mp4offsets": [
            [0,303103],
            [8441856,8444766]
        ],
        "continuity": "..."
    },
    {
        "index": 2,
        "start": 5.00,
        "end": 10.00,
        " mp4offsets ": [
            [0,40959],
            [290816,876543],
            [925696,929791],
            [995328,1011711],
            [8441856,8444766]
        ],
        "continuity": "..."
    },
    {
        "index": 3,
        "start": 10.00,
        "end": 14.96,
        " mp4offsets ": [
            [0,40959],
            [847872,1658879],
            [1687552,1691647],
            [1789952,1810431],
            [8441856,8444766]
        ],
        "continuity": "..."
    },
    {
        "index": 4,
        "begin": 14.96,
        "end": 19.88,
        " mp4offsets ": [
            [0,40959],
            [1626112,2400255],
            [2437120,2441215],
            [2531328,2547711],
            [8441856,8444766]
        ],
        "continuity": "..."
    },
]
```

Note that the MPEG-TS continuity counter values have been omitted in this example file.

One of the insights exploited by the invention is the fact that the segmenter tool will not access the entire source MP4 file when generating a particular segment. For instance, when generating the third segment, the tool will access the beginning or the end of the file, where the MP4 metadata is located, plus a range of offsets which correspond to the video/audio frames that need to be extracted to generate the chunk.

Figure 4:
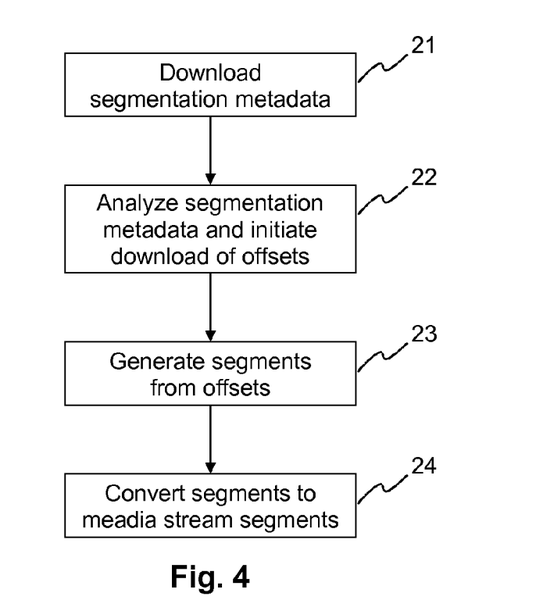
FIG. 4 shows the regeneration of HLS segments.

Therefore, according to the invention the segmenter tool is monitored upon each invocation to determine all the source MP4 file offsets that the tool reads. These offsets are saved in the segmentation metadata file and will be used in the regeneration step 20. There are several ways to monitor the source MP4 file offsets read by the tool. One possibility is to invoke the tool using the strace Unix command to trace all file system calls.

During the conversion step 13 all MP4 segments are converted into MPEG-TS containers and stitched together into a single MPEG-TS file. This step 13 must make sure that the stitched MPEG-TS file can be played back without error. This includes making sure that continuity counters are properly incremented and that PCR and PTS/DTS timestamps are valid and synchronized.

One possibility to perform this step is to employ the ffmpeg tool (see http://ffmpeg.org/), which supports conversion from MP4 to MPEG-TS. However, the segments created by ffmpeg cannot be stitched together by simple concatenation, as the values of continuity counters, PCR (Program Clock Reference) and PTS (Presentation Time Stamp)/DTS (Decode Time Stamp) would be incorrect. The solution is to concatenate the MPEG-TS segments produced by ffmpeg, and run a sanitizer tool, which fixes the continuity counters, PCR and PTS/DTS values. This can be achieved as follows.

For the continuity counters, on each segment transition the continuity counter values are modified to be consistent with the last counter value observed in the previous segment. These last counter values are saved in the segmentation metadata file.

For the PCR/PTS/DTS values, on each segment transition the PCR/PTS/DTS values will be reset to zero, as each segment is generated individually with a different time reference. However, a simple adjustment suffices. The PCR/PTS/DTS values are increased by a value equal to the start time of the segment, which can be found in the segmentation metadata file.

The MPEG-TS sanity check 14 is optional. It checks the MPEG-TS produced in the conversion step 13 to check that there are no playback errors due to discontinuities or incorrect timestamp values.

The injection step 15 involves injecting the MP4 file into the CDN and peer-to-peer storage spaces. The segmentation metadata file may be stored in the P2P tracker for easy access by peers. The MPEG-TS segments may also be injected into the CDN to avoid on-the-fly conversion on the CDN side.

FIG. 4 shows the regeneration 20 of the HLS segments in more detail. Also this step 20 is composed of several steps. In a first step 21 the segmentation metadata file is downloaded. In a second step 22 the segmentation metadata are analyzed to determine which MP4 offsets need to be downloaded and download of the determined MP4 offsets is initiated. Then MP4 segments are generated 23 and converted 24 to MPEG-TS segments with counter/timestamp consistency.

The regeneration step 20 is executed whenever the video is delivered to the user device using HLS. Typically, the device will request the segments sequentially, i.e. segment 1, segment 2, etc., although segments may be requested out of order after a fast-forward or rewind operation.

During the first download step 21 the peer-to-peer client obtains a copy of the segmentation metadata file for that particular video. One possibility is to download it from a tracker, provided the file has been previously been uploaded there.

For the MP4 offset download 22 the peer-to-peer client analyses the metadata to determine which MP4 offsets must be downloaded in order to generate each segment. For instance, in the above given example the offset ranges for the third segment are {[0,40959], [847872,1658879], [1687552, 1691647], [1789952,1810431], [8441856,8444766]}. The client then downloads these offsets and writes them to a local MP4 file. As in any peer-assisted system, such download might involve transfers from other peers and/or from the CDN.

Once this step 22 is over, the local MP4 file contains the original MP4 data in all the offsets that will be read by the segmenter tool to generate a particular segment. Other offsets may contain zeros, garbage, or the original MP4 data if those offsets have been previously fetched for other segments.

During the segment generation step 23 the segmenter tool is called to generate the specified segment. If the workaround presented above is employed, then the MP4Box options must be adjusted using the start times contained in the metadata file.

Finally, during the conversion step 24 the MP4 segment is converted into an MPEG-TS one, and sanitized to avoid discontinuities and incorrect timestamp values. This step is similar to the conversion step 13, the only difference being that the continuity counter values are adjusted using the information contained in the segmentation metadata file, as the previous video segment may not be available locally.

Figure 5:
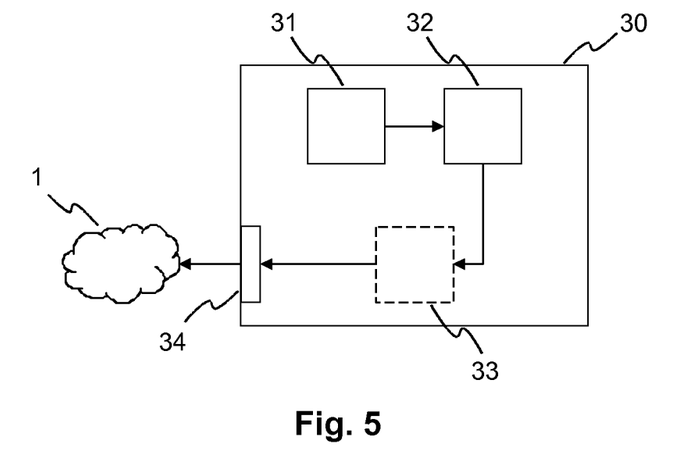
FIG. 5 schematically illustrates a device for preparing a video file for injection in a peer-assisted video delivery system.

A device 30 for distributing a video file via a peer-assisted video delivery system is schematically illustrated in FIG. 5. The device 30 comprises a segmenter 31 for segmenting the video file into segments, preferably fixed-duration segments, and for generating segmentation metadata. A converter 32 converts these segments to MPEG-TS segments with counter/timestamp consistency. An optional sanity checker 33 is provided for performing an MPEG-TS sanity check. Finally, an injector 34 injects the video file and the segmentation metadata into the CDN and the P2P network.

Figure 6:
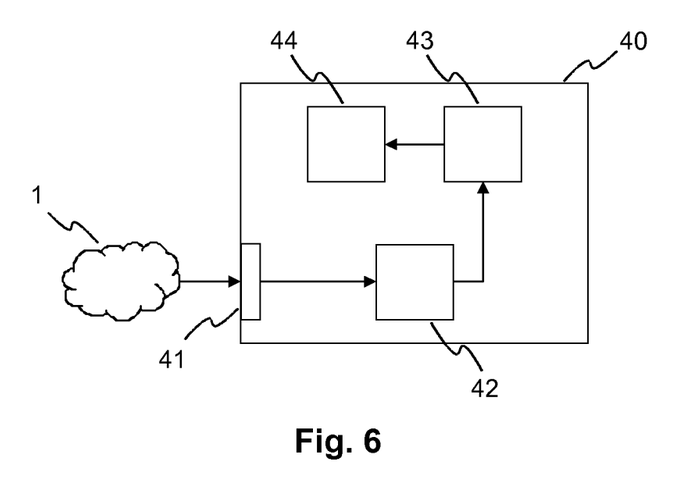
FIG. 6 schematically depicts a device for receiving a video file from a peer-assisted video delivery system.

A device 40 for receiving a video file from a peer-assisted video delivery system is schematically depicted in FIG. 6. The device 40 comprises a network connection 41 for downloading the segmentation metadata file. An analyzer 42 analyzes the metadata to determine which video offsets must be downloaded and initiates download of the determined video offsets. A segment generator 43 generates the video segments, which are then converted by a converter 44 to MPEG-TS segment with counter/timestamp consistency.

The invention claimed is:

1. A method for distributing a video file comprising frames via a peer-assisted video delivery system, the method comprising:
    segmenting the video file into temporal segments such that any frame of the video file is present in one and only one temporal segment, wherein each temporal segment is a self-contained physical object;
    generating segmentation metadata comprising at least video offsets corresponding to the video frames that need to be extracted from the video file to generate the temporal segments, continuity counter values suitable for detecting data loss, and segment start times;
    converting the temporal segments into media stream segments in accordance with a media stream format, which uses continuity counters and/or or timestamps, such that the continuity counters within the media stream segments and between consecutive media stream segments are properly incremented and/or or the timestamps within the media stream segments and between consecutive media stream segments are valid and synchronized; and
    injecting the video file and the segmentation metadata into the peer-assisted video delivery system.

2. The method according to claim 1, wherein the video file is segmented into fixed-duration temporal segments.

3. The method according to claim 1, wherein the video file is an MP4 file or an MKV file.

4. The method according to claim 1, wherein the media stream segments are converted MPEG transport stream segments.

5. A method for receiving a video file comprising frames from a peer-assisted video delivery system, the method comprising:
    downloading segmentation metadata comprising at least video offsets corresponding to video frames that were extracted from the video file to generate temporal segments of the video file, continuity counter values suitable for detecting data loss, and segment start times;
    analyzing the segmentation metadata to determine video offsets to be downloaded and for initiating download of the determined video offsets;
    downloading the determined video offsets for at least a full length segment;
    generating video segments from the downloaded video offsets; and
    converting the video segments into media stream segments in accordance with a media stream format, which uses continuity counters and/or or timestamps, such that the continuity counters within the media stream segments and between consecutive media stream segments are properly incremented and/or or the timestamps within the media stream segments and between consecutive media stream segments are valid and synchronized.

6. The method according to claim 5, wherein the video file is an MP4 file or an MKV file.

7. The method according to claim 5, wherein the media stream segments are MPEG transport stream segments.

8. An apparatus for distributing a video file comprising frames via a peer-assisted video delivery system, the apparatus comprising:
a segmenter configured for segmenting the video file into temporal segments such that any frame of the video file is present in one and only one temporal segment, wherein each temporal segment is a self-contained physical object, and to generate segmentation metadata comprising at least video offsets corresponding to the video frames that need to be extracted from the video file to generate the temporal segments, continuity counter values suitable for detecting data loss, and segment start times;
a converter configured for converting the temporal segments into media stream segments in accordance with a media stream format, which uses continuity counters or timestamps, such that the continuity counters within the media stream segments and between consecutive media stream segments are properly incremented or the timestamps within the media stream segments and between consecutive media stream segments are valid and synchronized; and
an injector configured for injecting the video file and the segmentation metadata into the peer-assisted video delivery system.

9. The apparatus according to claim 8, wherein the segmenter segments the video file into fixed-duration temporal segments.

10. The apparatus according to claim 8, wherein the video file is an MP4 file or an MKV file.

11. The apparatus according to claim 8, wherein the converter converts the media stream segments are MPEG transport stream segments.

12. An apparatus for receiving a video file comprising frames from a peer-assisted video delivery system, the apparatus comprising:
a network connector configured to download segmentation metadata comprising at least video offsets corresponding to video frames that were extracted from the video file to generate temporal segments of the video file, continuity counter values suitable for detecting data loss, and segment start times and to download the video offsets for at least a full length segment;
an analyzer configured to analyze the segmentation metadata to determine video offsets to be downloaded and to initiate download of the determined video offsets;
a segment generator configured to generate video segments from the downloaded video offsets; and
a converter configured to convert the video segments into media stream segments in accordance with a media stream format, which uses continuity counters or timestamps, such that the continuity counters within the media stream segments and between consecutive media stream segments are properly incremented or the timestamps within the media stream segments and between consecutive media stream segments are valid and synchronized.

13. The apparatus according to claim 12, wherein the video file is an MP4 file or an MKV file.

14. The apparatus according to claim 12, wherein the media stream segments are MPEG transport stream segments.

15. A method for distributing a video file comprising frames via a peer-assisted video delivery system, the method comprising:
segmenting the video file into temporal segments such that any frame of the video file is present in one and only one temporal segment, wherein each temporal segment is a self-contained physical object;
generating segmentation metadata comprising at least video offsets corresponding to the video frames that need to be extracted from the video file to generate the temporal segments, continuity counter values suitable for detecting data loss, and segment start times;
converting the temporal segments into media stream segments in accordance with a media stream format, which uses continuity counters and timestamps, such that the continuity counters within the media stream segments and between consecutive media stream segments are properly incremented and the timestamps within the media stream segments and between consecutive media stream segments are valid and synchronized; and
injecting the video file and the segmentation metadata into the peer-assisted video delivery system.

16. A method for receiving a video file comprising frames from a peer-assisted video delivery system, the method comprising:
downloading segmentation metadata comprising at least video offsets corresponding to video frames that were extracted from the video file to generate temporal segments of the video file, continuity counter values suitable for detecting data loss, and segment start times;
—analyzing the segmentation metadata to determine video offsets to be downloaded and for initiating download of the determined video offsets;
downloading the determined video offsets for at least a full length segment;
generating video segments from the downloaded video offsets; and
converting the video segments into media stream segments in accordance with a media stream format, which uses continuity counters and timestamps, such that the continuity counters within the media stream segments and between consecutive media stream segments are properly incremented and the timestamps within the media stream segments and between consecutive media stream segments are valid and synchronized.

17. An apparatus for distributing a video file comprising frames via a peer-assisted video delivery system, the apparatus comprising:
a segmenter for segmenting the video file into temporal segments such that any frame of the video file is present in one and only one temporal segment, wherein each temporal segment is a self-contained physical object, and to generate segmentation metadata comprising at least video offsets corresponding to the video frames that need to be extracted from the video file to generate the temporal segments, continuity counter values suitable for detecting data loss, and segment start times;

a converter for converting the temporal segments into media stream segments in accordance with a media stream format, which uses continuity counters and timestamps, such that the continuity counters within the media stream segments and between consecutive media stream segments are properly incremented and the timestamps within the media stream segments and between consecutive media stream segments are valid and synchronized; and an injector for injecting the video file and the segmentation metadata into the peer-assisted video delivery system.

18. An apparatus for receiving a video file comprising frames from a peer assisted video delivery system, the apparatus comprising:

a network connector for downloading segmentation metadata comprising at least video offsets corresponding to video frames that were extracted from the video file to generate temporal segments of the video file, continuity counter values suitable for detecting data loss, and segment start times to download the video offsets for at least a full length segment;

an analyzer for analyzing the segmentation metadata to determine video offsets to be downloaded and to initiate download of the determined video offsets;

a segment generator for generating video segments from the downloaded video offsets; and a converter for converting the video segments into media stream segments in accordance with a media stream format, which uses continuity counters and timestamps, such that the continuity counters within the media stream segments and between consecutive media stream segments are properly incremented and the timestamps within the media stream segments and between consecutive media stream segments are valid and synchronized.

* * * * *